(12) United States Patent
Subramanya et al.

(10) Patent No.: US 7,093,233 B1
(45) Date of Patent: Aug. 15, 2006

(54) COMPUTER-IMPLEMENTED AUTOMATIC CLASSIFICATION OF PRODUCT DESCRIPTION INFORMATION

(75) Inventors: Girish Subramanya, Bangalore (IN); Aravinda Mundakana, Bangalore (IN); Natarajan Chandramouli, Bangalore (IN)

(73) Assignee: i2 Technologies US, Inc., Dallas, TX (US)

( * ) Notice: Subject to any disclaimer, the term of this patent is extended or adjusted under 35 U.S.C. 154(b) by 849 days.

(21) Appl. No.: 10/121,241

(22) Filed: Apr. 11, 2002

Related U.S. Application Data

(60) Provisional application No. 60/301,996, filed on Jun. 28, 2001.

(51) Int. Cl.
*G06F 9/44* (2006.01)
(52) U.S. Cl. ...................................................... 717/123
(58) Field of Classification Search .................. 706/20; 707/7; 705/28; 717/123
See application file for complete search history.

(56) References Cited

U.S. PATENT DOCUMENTS 6,556,987 B1 *  4/2003  Brown et al. .................. 707/3
6,928,446 B1 *  8/2005  Westphal .................... 707/101

* cited by examiner

*Primary Examiner*—Kakali Chaki
*Assistant Examiner*—William H. Wood
(74) *Attorney, Agent, or Firm*—Steven J. Laureanti; James E. Walton

(57) ABSTRACT

Automatically classifying product description information includes selecting a first word from the information and determining whether the word is defined as a prefix within one or more keywords, each keyword being associated with one of a plurality of classes, each class being associated with one or more keywords. If the word is defined as a prefix, then for each keyword for which the word is defined as a prefix, determine whether all suffixes of the prefix within the keyword are found among all remaining words in the information in sequence. For each keyword for which this is true, generate a new result for each class associated with the keyword. Then select a first new result; compare the new result with one or more previous results each corresponding to a class; if a suffix count for the new result is greater than a suffix count for a previous result, mark the new result as unambiguous, the new result being thereafter considered a previous result; and if one or more new results generated for the first word remain unselected, select a next new result and repeat until no new results remain unselected. If one or more words in the information remain unselected after processing the first word, select a next word and repeat until no words remain unselected. If a single previous result is marked as unambiguous after all words in the information have been selected and processed, then classify the information in the class corresponding to the previous result marked as unambiguous.

28 Claims, 5 Drawing Sheets

| KEYWORD 102 | CLASS 104 |
|---|---|
| TRANSFORMER OIL | OIL |
| ENGINE OIL | OIL |
| STEPUP TRANSFORMER OIL | OIL |
| CAR ENGINE OIL | OIL |
| OIL TRANSFORMER | TRANSFORMER |
| OIL COOLED TRANSFORMER | TRANSFORMER |
| ⋮ | ⋮ |

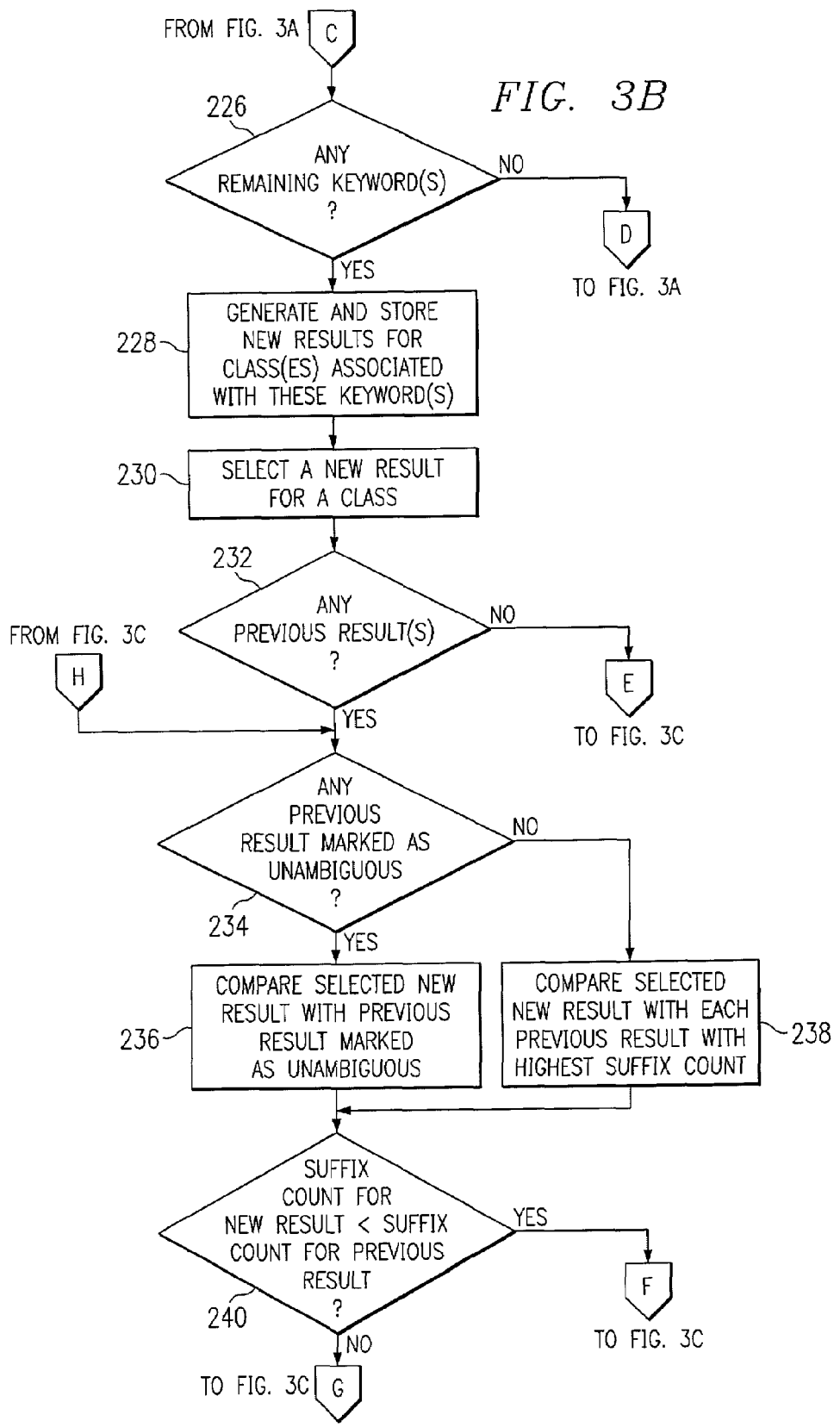

COMPUTER-IMPLEMENTED AUTOMATIC CLASSIFICATION OF PRODUCT DESCRIPTION INFORMATION

RELATED APPLICATIONS

This application claims the benefit under 35 U.S.C. § 119(e) of U.S. Provisional Application No. 60/301,996, filed Jun. 28, 2001.

TECHNICAL FIELD OF THE INVENTION

The present invention relates in general to electronic commerce and more particularly to computer-implemented automatic classification of product description information.

BACKGROUND OF THE INVENTION

Due to the ever-increasing popularity and accessibility of the Internet as a communication medium, the number of business transactions conducted using the Internet is also increasing, as are the numbers of buyers and sellers participating in electronic marketplaces that provide a forum for these transactions. The majority of electronic commerce ("e-commerce") transactions occur when a buyer determines a need for a product, identifies a seller such as a supplier that provides the product, and accesses the supplier's web site to arrange a purchase of the product. If the buyer does not have a preferred supplier or is purchasing the product for the first time, the buyer will often perform a search for a number of suppliers that offer the product and then access numerous supplier web sites to determine which supplier offers certain desired product features at the best price and under the best terms for the buyer. The matching phase of e-commerce transactions (matching the buyer with a particular supplier) is often inefficient because of the large amount of searching involved in finding a product and because once a particular product is found, the various offerings of that product by different suppliers may not be easily compared.

In general, computer-implemented automatic classification involves using one or more software components to classify product-related content (e.g., product description information) received from buyers or sellers into appropriate product classification schema. A schema can include a set of product classes (which can be referred to as a "taxonomy") organized in a hierarchy, with each class being associated with a set of product features, characteristics, or other product attributes (which can be referred to as a "product ontology"). For example, writing pens can have different kinds of tips (e.g., ball point or felt tip), different tip sizes (e.g., fine, medium or broad), and different ink colors (e.g., blue, black, or red). Accordingly, a schema can include a class corresponding to pens, which has a product ontology including tip type, tip size, ink color, or other appropriate attributes. Within a class, products may be defined by product attribute values (e.g., ball point, medium tip, blue ink). Product attribute values can include numbers, letters, figures, characters, symbols, or other suitable information for describing a product.

Previous techniques for automatically classifying product-related content into schema have used pattern matching methods involving keyword comparisons. The performance of previous techniques has typically been adequate for most needs. However, given the ever-increasing number of e-commerce transactions being conducted, and the ever-increasing number of product searches being performed, the performance of previous techniques is increasingly insufficient for certain needs.

SUMMARY OF THE INVENTION

According to the present invention, disadvantages and problems associated with previous techniques for classifying product-related content may be reduced or eliminated.

In a particular embodiment, a computer-implemented method for automatic classification of product description information includes automatically selecting a first word from the product description information and automatically determining whether the first word is defined as a prefix word within one or more keywords, where each keyword is associated with one of a plurality of classes, and where each class being associated with one or more keywords. If the first word is defined as a prefix word within one or more keywords, then for each keyword for which the first word is defined as a prefix word, automatically determine whether all suffix words of the prefix word within the keyword are found among all remaining words in the product description information in sequence. For each keyword for which all suffix words of the prefix word within the keyword are found among all remaining words in the product description information in sequence, automatically generate a new result for each class associated with the keyword. Perform the following: automatically select a first new result; automatically compare the first new result with one or more previous results each corresponding to a class; if a suffix count for the first new result is greater than a suffix count for a previous result, then automatically mark the new result as unambiguous, the new result being thereafter considered a previous result; and if one or more new results remain unselected, then automatically select a next new result and repeat the above-described steps of comparing, marking, and selecting a next new result until no new results generated for the first word remain unselected. If one or more words in the product description information remain unselected after processing the first word, then automatically select a next word and repeat the above-described steps of determining, determining, generating, performing, and selecting a next word until no words remain unselected. If a single previous result is marked as unambiguous after all words in the product description information have been selected and processed, automatically classify the product description information in the class corresponding to the previous result marked as unambiguous.

Particular embodiments of the present invention may provide one or more technical advantages. For example, certain embodiments of the present invention may provide computer-implemented automatic classification of product description information according to a technique that provides increased efficiency relative to previous techniques. As a result, less manual classification effort may be required and throughput for classification activities may be increased. In addition, certain embodiments of the present invention may allow product description information to be more accurately classified than with previous techniques, for example, according to associated industry verticals or commodity domains. Certain embodiments of the present invention may provide some, all, or none of these advantages. One or more other technical advantages may be readily apparent to one skilled in the art from the figures, description, and claims included herein.

BRIEF DESCRIPTION OF THE DRAWINGS

For a more complete understanding of the present invention and advantages thereof, reference is now made to the following descriptions, taken in conjunction with the accompanying drawings, in which.

DESCRIPTION OF EXAMPLE EMBODIMENTS

Figures 1, 2:
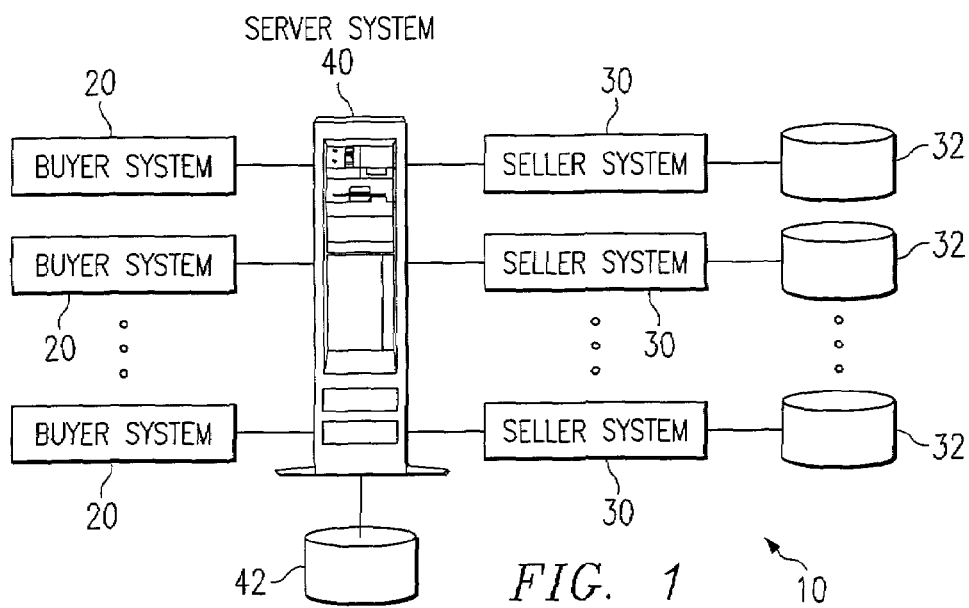
FIG. 1 illustrates an example system, which can be used for computer-implemented automatic classification of product description information according to one example embodiment of the present invention.
FIG. 2 illustrates an example table, which stores keywords incorporating prefixes and suffixes for classes in a product classification schema according to one example embodiment of the present invention.

FIG. 1 illustrates an example system 10 that can be used for computer-implemented automatic classification of product description information according to one example embodiment of the present invention. Although system 10 is described to provide an example of the type of environment in which automatic classification may be desirable, the present invention contemplates any suitable environment and is not intended to be limited to any particular environment except as specified in the appended claims. System 10 may include a network 12 coupling buyer systems 20, supplier or other seller systems 30, and a server system 40 associated with a global content directory (GCD) or other database 42 containing product-related content. Database 42 may include any appropriate data storage arrangements at one or more locations internal or external to server system 40. Server system 40 may enable e-commerce transactions between buyer systems 20 and seller systems 30, for example, based on product-related content stored in database 42.

Each component of system 10, including buyer systems 20, seller systems 30, and server system 40, may operate on one or more computer systems at one or more locations. Each such computer system may include one or more appropriate input devices, output devices, communications interfaces, processors, memories, mass data storage, or other appropriate resources. Network 12 may include any appropriate combination of wireline, optical, wireless, or other links coupling buyer systems 20, seller systems 30, and server system 40. For example, network 12 may include a portion of the Internet and any appropriate local area networks (LANs), metropolitan area networks (MANs), or wide area networks (WANs) coupling buyer systems 20, seller systems 30, and server system 40 to the Internet.

Although buyer systems 20 and seller systems 30 are described as associated with separate entities, a buyer system 20 in one transaction may be a seller system 30 in another transaction, and vice versa. Furthermore, reference to buyer system 20 or seller system 30 is meant to include one or more associated persons or enterprises, where appropriate. For example, a buyer system 20 may include a computer system programmed to autonomously identify a need for a product, search for the product, and buy the product upon identifying a suitable seller of the product. Although sales transactions between buyers and sellers are primarily described, the present invention contemplates computer-implemented automatic classification of product description information in connection with any appropriate phase of any appropriate e-commerce transaction. Moreover, reference to "products" is meant to include tangible goods, real property, services, information, or any other suitable thing for which automatic classification may be performed according to the present invention.

In one embodiment, as noted above, database 42 may be a GCD providing a universal directory of the contents of multiple seller databases 32 (and potentially all seller databases 32). Most or all content in seller databases 32 may remain stored in seller databases 32, but suitable portions of this content are also preferably stored in database 42 and made accessible to users associated with buyer systems 20 using server system 40. Server system 40 and database 42 may provide such users with access to content relating to any number of products extracted from any number of seller databases 32. Although product-related content is primarily described as being extracted from seller databases 32 for storage in database 42, the present invention contemplates product-related content in database 42 originating from any appropriate source or sources internal or external to server system 40.

Database 42 may provide a directory of products according to a directory structure in which products are organized using a hierarchical classification system. A user associated with a buyer system 20 may navigate the directory to identify a particular product class into which products are categorized, for example, during the matching phase of an e-commerce transaction. Content associated with a product included in a product class and searchable using the directory may actually be stored in, and when requested obtained "on the fly" from, one or more seller databases 32. However, requested content may be transparently provided to buyer system 20 such that all the content appears to a user associated with buyer system 20 as being stored in database 42.

Although these operations are described as being performed primarily at server system 40, those skilled in the art will readily appreciate that these operations could be performed at any one or more appropriate computer systems at one or more appropriate locations. For example, these operations could be performed at a seller system 30 based on product description information received directly from a buyer system 20.

FIG. 2 illustrates an example table 100, which stores keywords 102 that incorporate prefixes and suffixes for product classes 104 in a product classification schema according to one example embodiment of the present invention. Example table 100 represents at least a portion of a "knowledge base" stored at or otherwise associated with a computer system that receives and automatically classifies product description information, for example, server system 40 or a seller system 30. Each keyword 102 may be a "complex" keyword including one or more words 106. As used herein, reference to a "word" is meant to include any suitable text, numerals, symbols, or other characters separated from other such words using spaces or other appropriate delimiters. The relations between keywords 102 and classes 104 may be defined in any suitable manner, for example, manually or using a suitable software tool. Incorporating multiple words 106 into a single keyword field, as illustrated in FIG. 2, may allow automatic classification to be performed more quickly than if each word 106 was assigned a separate field.

A word 106 may be a prefix of another word 106 in keyword 102 (if coming before the other word 106), a suffix of another word 106 in keyword 102 (if coming after the other word 106), simultaneously both a prefix and a suffix of other words 106 in keyword 102 (if between the other words 106), or neither a prefix nor a suffix of other words 106 in keyword 102 (if there are no other words 106 in keyword 102). For example, within keyword 102a, "Transformer" is a prefix of "Oil" and "Oil" is a suffix of "Transformer." As another example, within keyword 102b, "Stepup" is a prefix of both "Transformer" and "Oil," "Transformer" is a prefix of "Oil" and also a suffix of "Stepup," and "Oil" is a suffix of both "Stepup" and "Transformer." In one particular embodiment, for purposes of automatic classification, only the first word 106 within a keyword 102 will be defined in the knowledge base as a prefix for keyword 102 and thus for the corresponding product class 104, while all other words 106 within the keyword 102 will be defined in the knowledge base as suffixes for the keyword 102 and thus for the corresponding product class 104. For example, in this situation, "Stepup" would be the sole prefix of keyword 102b and thus defined as a prefix for the "Oil" class 104, while "Transformer" and "Oil" would both be suffixes for keyword 102b and thus defined as suffixes for the "Oil" class 104.

Additional information may stored in table 100 or elsewhere in a knowledge base to further refine the automatic classification process. For example, one or more "exclude" words may be associated with a product class 104 such that if received product description information includes a word matching an exclude word for an otherwise appropriate class 104, then the product description information will be prevented from being classified in that class 104. As a particular example, the word "Transformer" might be stored as an exclude word for a "Lubricants" class 104. As such, the input text containing the words "Transformer Oil" as product description information would be prevented from being classified in "Lubricants" class 104 even though this might otherwise be the most appropriate class 104 for the input text.

As another example of additional information that may be used to refine the automatic classification process, one or more "strip" words may be stored such that, preferably prior to classifying received product description information, the presence of a strip word in the product description information will cause one or more words appearing after the strip word to be stripped out or otherwise removed. In a particular embodiment, all words including and subsequent to the strip word but before a next delineator character (such as a comma or semi-colon), are removed. The delineator character itself may also be removed, where appropriate. For example, assume that the received input text includes "Class-A Hex Nut for Pipe Fitting; Size 1 Inch" as product description information. If "For" is defined as a strip word, then the words including and subsequent to word "for" in the input text but before the semi-colon (i.e. "for pipe fitting"), along with the semi-colon itself, may be removed. In this example, the remaining input text to be classified would include "Class-A Hex Nut Size 1 Inch." Other appropriate strip words might typically include "With," "On," or other prepositions. In one embodiment, use of one or more strip words may help to reduce ambiguities in the classification.

Figure 3A:
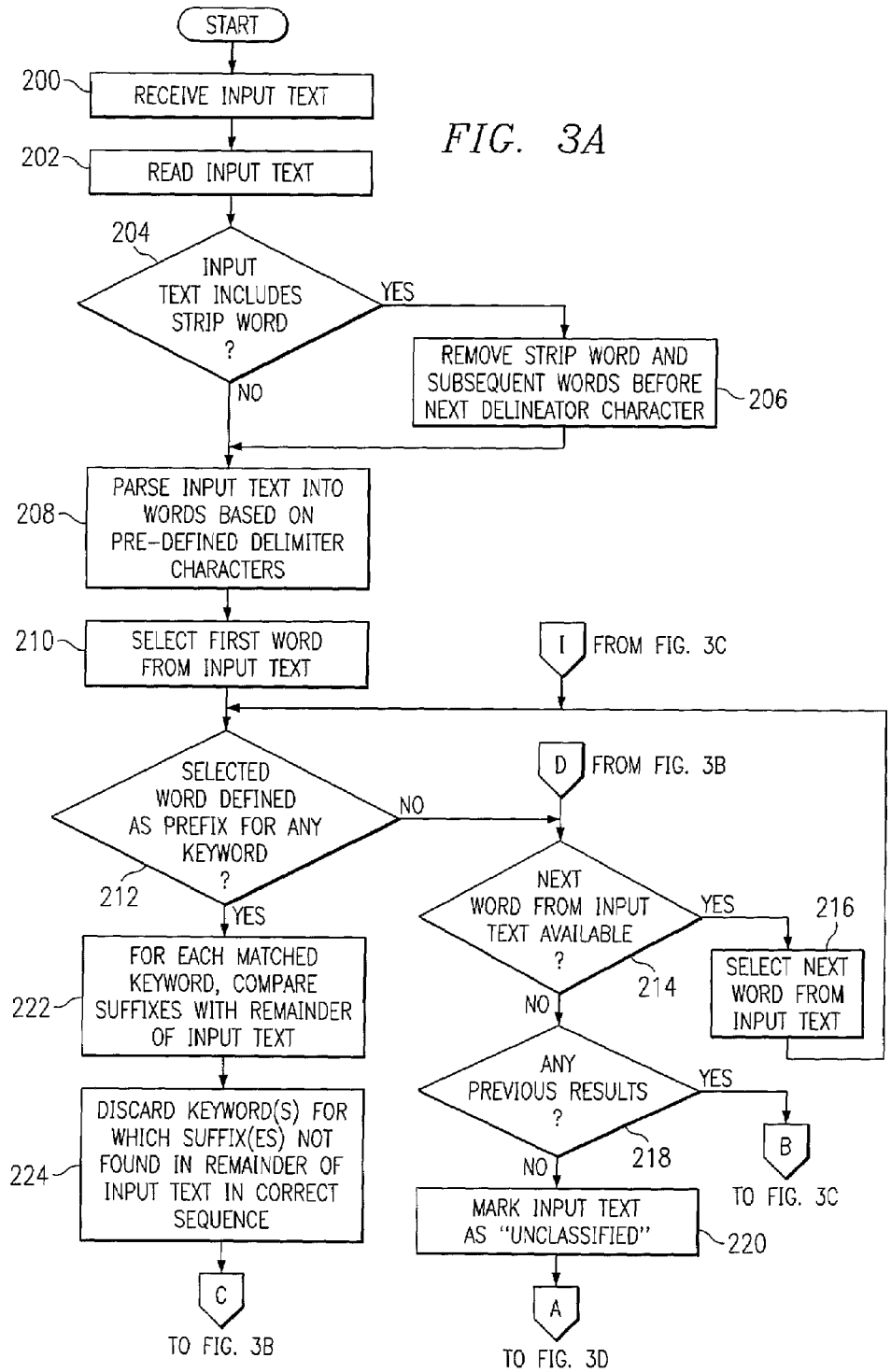
FIG. 3 illustrates an example method, which can be used for computer-implemented automatic classification of product description information according to one example embodiment of the present invention.
Figure 3C:
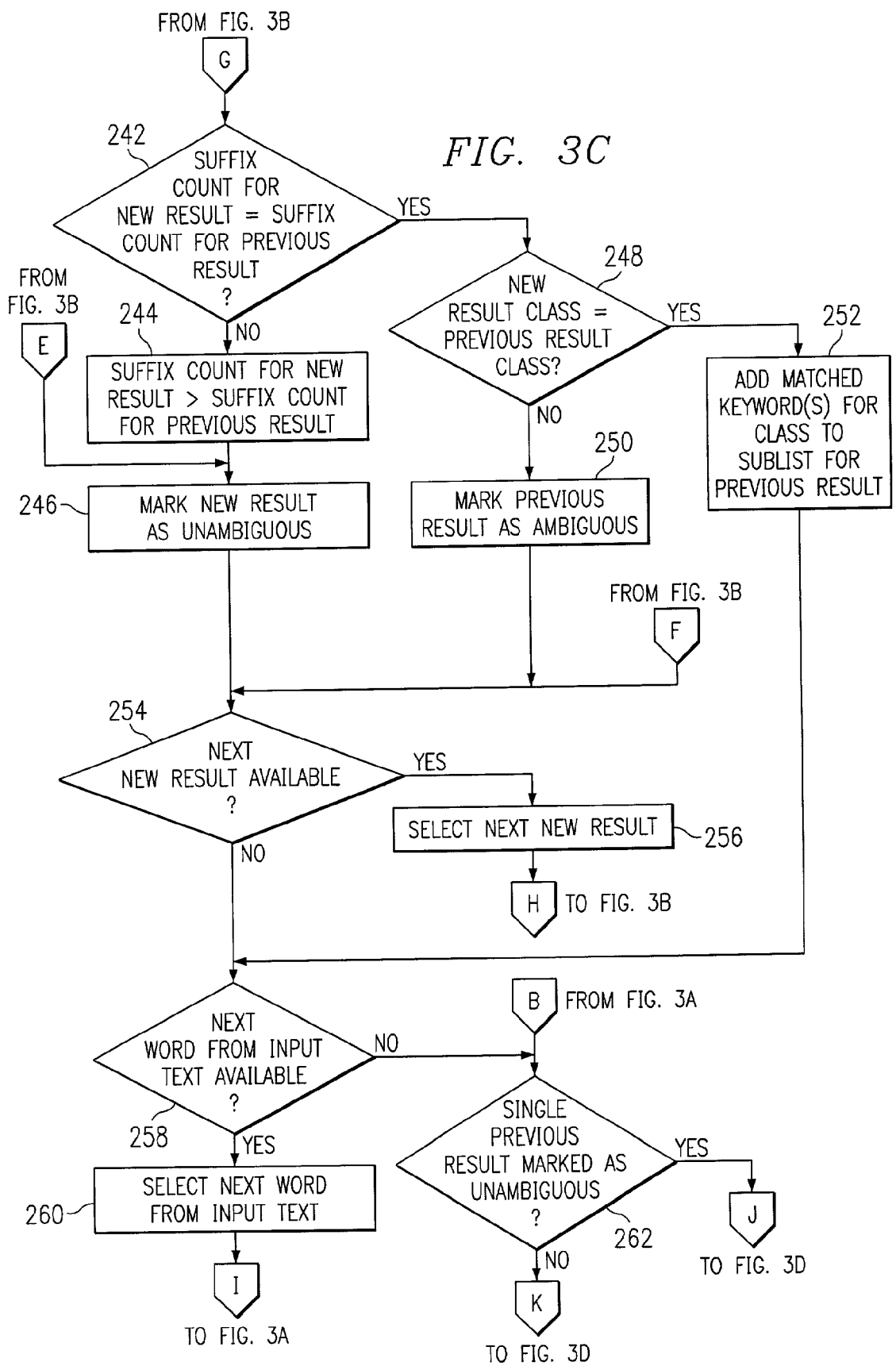
Figure 3D:
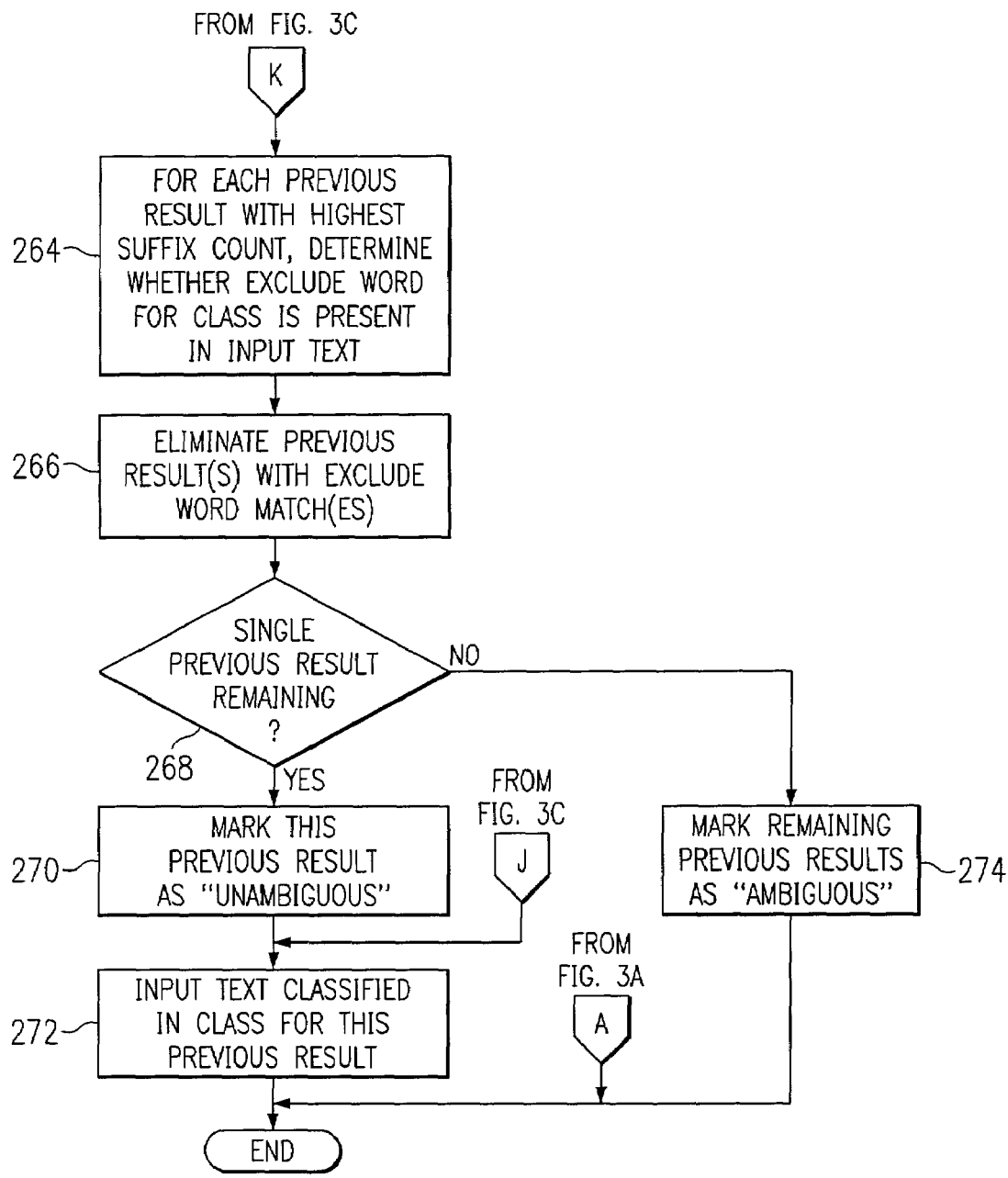

FIG. 3 illustrates an example method, which can be used for computer-implemented automatic classification of product description information according to one example embodiment of the present invention. While the method is described as being performed primarily at server system 40, those skilled in the art will appreciate that the method could be performed at any one or more appropriate computer systems at one or more appropriate locations. For example, the method could be performed at a seller system 30 based on product description information received directly from a buyer system 20.

The method begins at step 200, where server system 40 receives input text including product description information to be classified from a buyer system 20, seller system 30, or other source. Server system 40 reads the input text at step 202 and, at step 204, determines whether the input text includes any defined strip words. If the input text includes a strip word, then at step 206 server system 40 strips out or otherwise removes the strip word and any other words appearing subsequent to the strip word but before a next delineator character, if one exists. As described above, a delineator character itself may also be removed. If there are no strip words in the input text at step 204, or after appropriate portions of the input text are stripped out at step 206, server system 40 parses the input text into its constituent words based on one or more pre-defined delimiter characters (e.g., spaces) at step 208.

At step 210, server system 40 selects the first word from the input text and, at step 212, determines whether the word is defined in the knowledge base as a prefix for one or more keywords 102. In one embodiment, as described above, for purposes of automatic classification only the first word 106 in keyword 102 is defined in the knowledge base as a prefix for keyword 102, while all other words 106 in keyword 102 are defined in the knowledge base as suffixes for keyword 102. If the selected word is not defined as a prefix for a keyword at step 212 and a next word from the input text is available at step 214, then the next word from the input text is selected at step 216 and the method returns to step 212 to determine whether the next word is defined as a prefix for one or more keywords 102. If a next word from the input text is not available at step 214 and there are no previous results (described more fully below) at step 218, then automatic classification has not been accomplished, server system 40 marks the input text as "unclassified" or otherwise indicates that the input text has not been automatically classified at step 220, and the method ends. In one embodiment, marking the input text as "unclassified" may include setting a flag or other indicator associated with a result data structure for the input text. If there are one or more previous results at step 218, then the method proceeds to step 262.

At step 222, for each keyword 102 matched at step 212 (i.e. for which the prefix matched the selected word from the input text), server system 40 compares the suffixes for the keyword 102 with the remainder of the input text (i.e. words in the input text subsequent to the selected word). In a particular embodiment, the words in the remainder of the input text need not appear consecutively like the suffixes in a keyword 102 to match the suffixes in the keyword 102, but must appear in the same sequence as the suffixes. For example, the remainder of the input text might contain the words "Transformer Coolant Oil" and defined suffixes for a keyword 102 might be "Transformer" and "Oil" (as in keyword 102b). In this case, although the word "Coolant" appears between the words "Transformer" and "Oil" in the input text, the words "Transformer" and "Oil" appear in the same sequence as in the keyword 102. At step 224, server system 40 discards all keywords for which the suffixes are not found in the remainder of the input text in the correct sequence.

If no keywords 102 remain at step 226, then the method returns to step 214. If one or more keywords 102 remain at step 226, then at step 228 server system 40 generates and stores new results for the classes associated with these keywords 102, one new result for each such class. In one embodiment, a result data structure is generated and stored for each class associated with such a keyword 102, and a list data structure maintains a list of all the results for these classes. The list is empty at the start of the automatic classification process, but grows as the process proceeds until all words in the input text have been processed. Each result may have an associated field in the list data structure that may be used to indicate whether the result corresponds to a class in which the input text has been, at least temporarily, classified ambiguously (i.e. the result is marked as "ambiguous" to indicate that the input text could possibly be classified in another class) or unambiguously (i.e. the result is marked as "unambiguous" to indicate that the input text cannot possibly be classified in another class).

If one or more ambiguous results remain after server system 40 has completed its automatic classification operations, a person may need to manually validate these ambiguous classifications to identify the single correct class for classification of the input text. If only an unambiguous result remains, the single correct class has been identified. In one embodiment, the list data structure may also maintain a sublist of one or more keywords 102 (i.e. keywords 102 matched at step 212 and not discarded at step 224) for each listed result (and thus for the class corresponding to the result).

If the class corresponding to a new result is the same as the class corresponding to a previously listed result, the one or more keywords 102 that correspond to the new result may be added to the sublist of keywords 102, if not already in the sublist. At the end of the automatic classification process the sublist, containing all one or more keywords 102 matched for the class in which the input text is ultimately classified, may provide a basis for the classification that may be useful to any person that may attempt to validate the classification. The present invention contemplates validating any classification, whether ambiguous or unambiguous, according to particular needs and circumstances.

At step 230, server system 40 selects a new result, for example, from the list maintained in the list data structure. If there are no previous results in the list at step 232, then the method proceeds to step 246 where the selected new result is marked at least temporarily as "unambiguous" in the manner described above. If there are one or more previous results in the list at step 232, then the suffix count of the selected new result will be compared with the suffix counts of one or more of the previous results.

In one embodiment, the suffix count of a result is the number of suffixes in a matched keyword 102 (i.e. matched at step 212 and not discarded at step 220) for the result (and thus for the class corresponding to the result). In this embodiment, each result corresponds to a particular class and has a suffix count that is updated during the keyword matching process for the class so as to equal the number of suffixes of the matched keyword 102 for the class that currently has the most suffixes of all the one or more matched keywords 102. If a newly matched keyword 102 for the class has a different prefix and more suffixes than the matched keyword 102 for the class previously having the most suffixes, then the suffix count for the result is updated so as to equal the number of suffixes of the newly matched keyword 102. Therefore, in this embodiment, at the end of the keyword matching process for the class, the suffix count for the corresponding result is equal to the number of suffixes for the matched keyword 102 that has the most suffixes of all the one or more matched keywords 102 for the class.

If a previous result is marked as "unambiguous" at step 234, the selected new result is compared with this unambiguous previous result at step 236. If no previous result is marked as "unambiguous" at step 234, then the selected new result is instead compared at step 238 with each previous result having the highest suffix count. For example, two or more previous results sharing the same highest suffix count may each be marked as "ambiguous" based on earlier operations of server system 40 within the automatic classification process.

If at step 240 the suffix count for the selected new result is less than the suffix count for the previous result (i.e. the unambiguous previous result compared at step 236 or the two or more previous results having the highest suffix count compared at step 238), then the new result does not correspond to the correct class for classifying the input text and the method then proceeds to step 254. If the suffix count for the selected new result is not less than the suffix count for the previous result at step 240, and the suffix count for the selected new result is also not equal to the suffix count for the previous result at step 242, meaning that the suffix count for the selected new result is greater than the suffix count for the previous result at step 244, then the new result corresponds, at least temporarily, to the correct class for classification of the input text and, as such, is marked as "unambiguous" at step 246. In a case where the previous result with which the new result was being compared had been marked as "unambiguous" (step 236), then marking the new result as "unambiguous" at step 246 may include unmarking that previous result or otherwise indicating that the previous result is no longer considered to correspond to the correct class for classification of the input text. Similarly, in a case where the previous result with which the new result was being compared had been marked as "ambiguous," such as where two or more previous results shared the same highest suffix count (step 238) and had both been marked as "ambiguous," then marking the new result as "unambiguous" at step 246 may include unmarking all such previous results or otherwise indicating that such previous results are no longer considered to possibly correspond to the correct class for classification of the input text.

If the suffix count for the selected new result is not less than the suffix count for the previous result at step 240, but the suffix count for the selected new result is equal to the suffix count for the previous result at step 242, then server system 40 determines at step 248 whether the class corresponding to the new result is the same as the class corresponding to the previous result. If these classes are not the same at step 248, then server system 40 may mark the previous result as "ambiguous" at step 250. Server system 40 may mark both the new result and the previous result as "ambiguous" if appropriate. If these classes are the same at step 248, then the one or more keywords 102 corresponding to the new result may be added to the sublist of keywords 102 for the previous result at step 252, if not already in the sublist, as described more fully above.

At step 254, processing of the first selected new result is complete and the new result may be considered a previous result in connection with processing of any later selected new results. If a next new result is available at step 254, the next new result is selected at step 256 and the method returns to step 234, where it is assumed that at least one previous result exists based at least on processing of the first new result. Steps 234 through 256 may be repeated for each of the new results generated and stored at step 228. If no next new result is available at step 254, then at step 258 processing of the first selected word of the input text is complete.

If a next word from the input text is available at step 258, the next word is selected at step 260 and the method returns to step 212. Steps 212 through 260 may be repeated for each word of the input text identified at step 208.

If no next word is available at step 258, and a single previous result is marked as "unambiguous" at step 262, then server system 40 classifies the input text in the class corresponding to this previous result at step 272, and the method ends. If no single previous result is marked as "unambiguous" at step 262, then at step 264, for each previous result with the highest suffix count (each of which may be marked as "ambiguous" as described above), server system 40 determines whether an exclude word for the class corresponding to the previous result is present in the input text. At step 266, all previous results for which such an exclude word is present in the input text are eliminated from consideration. If at step 268, after the application of one or more exclude words, a single previous result remains under consideration, then the server system 40 marks this previous result as "unambiguous" at step 270, the server system 40 classifies the input in the class corresponding to this previous result at step 272, and the method ends. If at step 268, after application of one or more exclude words, more than one previous result remains under consideration, then the server system 40 marks the remaining previous results as "ambiguous" at step 274, and the method ends. In the latter case, where the classification is ambiguous, the present invention contemplates manual validation of the classification to select the class for one of these remaining previous results as the correct class for classification of the input text.

As an example of the above-described method, with reference to the example table illustrated in FIG. 2, assume that the input text for the product description information to be classified includes "Oil Transformer." As such, the word "Oil" is the first word selected from the input text (step 210) and the word "Oil" is defined as a prefix for the "Oil Transformer" and "Oil Cooled Transformer" keywords 102 (step 212). For the "Oil Transformer" keyword 102 (step 222), the only suffix to the "Oil" prefix is "Transformer," which is found in the remainder of the input text in the correct sequence, such that the "Oil Transformer" keyword 102 is not discarded (step 224). However, for the "Oil Cooled Transformer" keyword 102 (step 222), the two suffixes to the "Oil" prefix are "Cooled" and "Transformer," which are not found in the remainder of the input text in the correct sequence, such that in this case the "Oil Cooled Transformer" keyword 102 is discarded (step 224). For the single remaining "Oil Transformer" keyword 102, a new result is generated and stored for the one or more associated classes (step 228), in this simple case a single new result for the "Transformer" class 104. Assuming there are no previous results (step 232), the new result is marked as "unambiguous" (step 246).

Since there are no other new results (step 254), the next word "Transformer" is selected from the input text (step 260) and the word "Transformer" is processed in the same manner as described above for the word "Oil." The word "Transformer" is defined as a prefix for only the "Transformer Oil" keyword 102 (step 212). For the "Transformer Oil" keyword 102 (step 222), the only suffix to the "Transformer" prefix is "Oil," which is not found in the remainder of the input text in the correct sequence, such that the "Transformer Oil" keyword 102 is discarded (step 224). Since there are no other keywords 102 (step 226), there are no other words in the input text (step 214), there is one previous result based on processing of the first selected word "Oil" (step 218), and the single previous result has been marked as "unambiguous" (step 262), the input text is classified in the class corresponding to that previous result, the "Transformer" class 104.

As another example, assume that the input text for the product description information to be classified includes "Transformer Oil." The word "Transformer" is the first word selected from the input text (step 210) and the word "Transformer" is defined as a prefix for only the "Transformer Oil" keyword 102 (step 212). For the "Transformer Oil" keyword 102 (step 222), the only suffix to the "Transformer" prefix is "Oil," which is found in the remainder of the input text in the correct sequence, such that the "Transformer Oil" keyword 102 is not discarded (step 224). For the single remaining "Transformer Oil" keyword 102, a new result is generated and stored for the one or more associated classes (step 228), in this simple case a single new result for the "Oil" class 104. Assuming there are no previous results (step 232), the new result is marked as "unambiguous" (step 246).

Since there are no other new results (step 254), the next word "Oil" is selected from the input text (step 260) and the word "Oil" is processed in the same manner as described above for the word "Transformer." The word "Oil" is defined as a prefix for the "Oil Transformer" and "Oil Cooled Transformer" keywords 102 (step 212). For the "Oil Transformer" keyword 102 (step 222), the only suffix to the "Oil" prefix is "Transformer," which is not found in the remainder of the input text in the correct sequence, such that the "Oil Transformer" keyword 102 is discarded (step 224). For the "Oil Cooled Transformer" keyword 102 (step 222), the two suffixes to the "Oil" prefix are "Cooled" and "Transformer," which are not found in the remainder of the input text in the correct sequence, such that the "Oil Cooled Transformer" keyword 102 is also discarded (step 224). Since there are no other keywords 102 (step 226), there are no other words in the input text (step 214), there is one previous result based on processing of the first selected word "Transformer" (step 218), and the single previous result has been marked as "unambiguous" (step 262), the input text is classified in the class corresponding to that previous result, the "Oil" class 104.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented system for automatically classifying product description information, comprising:
    a server component operable to:
    automatically determine whether a predetermined strip word is found in the product description information, before the first word is selected and if so, eliminate the strip word and each word found subsequent to the strip word and before a next delineator in the product description information;
    automatically select a first word from the product description information;
    automatically determine whether the first word is defined as a prefix word within one or more keywords, each keyword being associated with one of a plurality of classes, each class being associated with one or more keywords;
    if the first word is defined as a prefix word within one or more keywords, then for each keyword for which the first word is defined as a prefix word, automatically determine whether all suffix words of the prefix word within the keyword are found among all remaining words in the product description information in sequence;

for each keyword for which all suffix words of the prefix word within the keyword are found among all remaining words in the product description information in sequence, automatically generate a new result for each class associated with the keyword;

perform the following:

automatically select a first new result;

automatically compare the first new result with one or more previous results each corresponding to a class;

if a suffix count for the first new result is greater than a suffix count for a previous result, then automatically mark the new result as unambiguous, the new result being thereafter considered a previous result; and if one or more new results remain unselected, then automatically select a next new result and repeat the above-described steps of comparing, marking, and selecting a next new result until no new results generated for the first word remain unselected;

if one or more words in the product description information remain unselected after processing the first word, then automatically select a next word and repeat the above-described steps of determining, determining, generating, performing, and selecting a next word until no words remain unselected; and if a single previous result is marked as unambiguous after all the words in the product description information have been selected and processed, then automatically classify the product description information in the class corresponding to the previous result marked as unambiguous.

2. The system of claim 1, wherein the suffix words are consecutive and corresponding words found in sequence in the product description information are not consecutive, the product description information comprising an intervening word not corresponding to a suffix word located between two words corresponding to suffix words.

3. The system of claim 1, wherein the server component is further operable to:

maintain each result as a separate result data structure until deleted; and maintain a list data structure comprising a list of all results for which result exist, each result having an associated indicator in the list data structure that may be used to mark the result as unambiguous, ambiguous, or unclassified as appropriate.

4. The system of claim 1, wherein the new result is either:

compared with a single previous result marked as unambiguous; or compared with a plurality of previous results sharing a highest suffix count.

5. The system of claim 4, wherein each previous result that shares the highest suffix count has been marked as ambiguous to indicate that classification of the product description information in the class corresponding to the previous result should be manually validated.

6. The system of claim 1, wherein the server component is further operable to, if the suffix count for the first new result is less than the suffix count for the previous result, then automatically select a next new result and compare the next new result with the one or more previous results until:

the suffix count for a selected next new result is greater than or equal to the suffix count for a previous result; or there are no more new results from which to select.

7. The system of claim 1, wherein the server component is further operable to, if the suffix count for the first new result is equal to the suffix count for the previous result, then automatically determine whether the class for the first new result is the same as the class for the previous result and:

if not, mark the previous result as ambiguous to indicate that classification of the product description information in the class corresponding to the previous result should be manually validated; and if so, add the one or more keywords associated with the class to a sublist of keywords maintained for the previous result.

8. The system of claim 1, wherein the server component is further operable to, if a single previous result is not marked as unambiguous after all words in the product description information have been selected and processed, then:

for each previous result with a highest suffix count, automatically determine whether a predetermined exclude word for the class corresponding to the previous result is found among all the words of the product description information and, if so, eliminate the previous result; and if a single previous result with a highest suffix count remains, automatically mark this previous result as unambiguous and classify the product description information in the class corresponding to this previous result.

9. The system of claim 8, wherein the server component is further operable to, if more than one previous result with a highest suffix count remains, automatically mark this previous result as ambiguous to indicate that classification of the product description information in the class corresponding to this previous result should be manually validated.

10. A computer-implemented method for automatically classifying product description information, comprising:

automatically determining whether a predetermined strip word is found in the product description information, before the first word is selected, and if so, eliminating the strip word and each word found subsequent to the strip word and before a next delineator in the product description information;

automatically selecting a first word from the product description information;

automatically determining whether the first word is defined as a prefix word within one or more keywords, each keyword being associated with one of a plurality of classes, each class being associated with one or more keywords;

if the first word is defined as a prefix word within one or more keywords, then for each keyword for which the first word is defined as a prefix word, automatically determining whether all suffix words of the prefix word within the keyword are found among all remaining words in the product description information in sequence;

for each keyword for which all suffix words of the prefix word within the keyword are found among all remaining words in the product description information in sequence, automatically generating a new result for each class associated with the keyword;

performing the following:
automatically selecting a first new result;
automatically comparing the first new result with one or more previous results each corresponding to a class;
if a suffix count for the first new result is greater than a suffix count for a previous result, then automatically marking the new result as unambiguous, the new result being thereafter considered a previous result; and
if one or more new results remain unselected, then automatically selecting a next new result and repeating the above-described steps of comparing, marking, and selecting a next new result until no new results generated for the first word remain unselected;
if one or more words in the product description information remain unselected after processing the first word, then automatically selecting a next word and repeating the above-described steps of determining, generating, performing, and selecting a next word until no words remain unselected; and
if a single previous result is marked as unambiguous after all words in the product description information have been selected and processed, then automatically classifying the product description information in the class corresponding to the previous result marked as unambiguous.

11. The method of claim 10, wherein the suffix words are consecutive and corresponding words found in sequence in the product description information are not consecutive, the product description information comprising an intervening word not corresponding to a suffix word located between two words corresponding to suffix words.

12. The method of claim 10, wherein:
once generated, each result is maintained as a separate result data structure until deleted; and
a list of all results for which result data structures exist is maintained using a list data structure, each result having an associated indicator in the list data structure that may be used to mark the result as unambiguous, ambiguous, or unclassified as appropriate.

13. The method of claim 10, wherein the new result is either:
compared with a single previous result marked as unambiguous; or
compared with a plurality of previous results sharing a highest suffix count.

14. The method of claim 13, wherein each previous result that shares the highest suffix count has been marked as ambiguous to indicate that classification of the product description information in the class corresponding to the previous result should be manually validated.

15. The method of claim 10, further comprising if the suffix count for the first new result is less than the suffix count for the previous result, then automatically selecting a next new result and comparing the next new result with the one or more previous results until:
the suffix count for a selected next new result is greater than or equal to the suffix count for a previous result; or
there are no more new results from which to select.

16. The method of claim 10, further comprising if the suffix count for the first new result is equal to the suffix count for the previous result, then automatically determining whether the class for the first new result is the same as the class for the previous result and:
if not, marking the previous result as ambiguous to indicate that classification of the product description information in the class corresponding to the previous result should be manually validated; and
if so, adding the one or more keywords associated with the class to a sublist of keywords maintained for the previous result.

17. The method of claim 10, further comprising if a single previous result is not marked as unambiguous after all words in the product description information have been selected and processed, then:
for each previous result with a highest suffix count, automatically determining whether a predetermined exclude word for the class corresponding to the previous result is found among all the words of the product description information and, if so, eliminating the previous result; and
if a single previous result with a highest suffix count remains, automatically marking this previous result as unambiguous and classifying the product description information in the class corresponding to this previous result.

18. The method of claim 17, further comprising if more than one previous result with a highest suffix count remains, automatically marking this previous result as ambiguous to indicate that classification of the product description information in the class corresponding to this previous result should be manually validated.

19. Software for automatically classifying product description information, the software being embodied in computer-readable media and when executed operable to:
automatically determine whether a predetermined strip word is found in the product description information, before the first word is selected, and if so, eliminate the strip word and each word found subsequent to the strip word and before a next delineator in the product description information;
automatically select a first word from the product description information;
automatically determine whether the first word is defined as a prefix word within one or more keywords, each keyword being associated with one of a plurality of classes, each class being associated with one or more keywords;
if the first word is defined as a prefix word within one or more keywords, then for each keyword for which the first word is defined as a prefix word, automatically determine whether all suffix words of the prefix word within the keyword are found among all remaining words in the product description information sequence;
for each keyword for which all suffix words of the prefix word within the keyword are found among all remaining words in the product description information in sequence, automatically generate a new result for each class associated with the keyword;
perform the following:
automatically select a first new result;
automatically compare the first new result with one or more previous results each corresponding to a class;
if a suffix count for the first new result is greater than a suffix count for a previous result, then automatically mark the new result as unambiguous, the new result being thereafter considered a previous result; and
if one or more new results remain unselected, then automatically select a next new result and repeat the above-described operations of comparing, marking, and selecting a next new result until no new results generated for the first word remain unselected;

if one or more words in the product description information remain unselected after processing the first word, then automatically select a next word and repeating the above-described operations of determining, generating, performing, and selecting a next word until no words remain unselected; and if a single previous result is marked as unambiguous after all words in the product description information have been selected and processed, then automatically classify the product description information in the class corresponding to the previous result marked as unambiguous.

20. The software of claim 19, wherein the suffix words are consecutive and corresponding words found in sequence in the product description information are not consecutive, the product description information comprising an intervening word not corresponding to a suffix word located between two words corresponding to suffix words.

21. The software of claim 19, operable to:

maintain each result as a separate result data structure until deleted; and maintain a list data structure comprising a list of all results for which result exist, each result having an associated indicator in the list data structure that may be used to mark the result as unambiguous, ambiguous, or unclassified as appropriate.

22. The software of claim 19, wherein the new result is either:

compared with a single previous result marked as unambiguous; or compared with a plurality of previous results sharing a highest suffix count.

23. The software of claim 22, wherein each previous result that shares the highest suffix count has been marked as ambiguous to indicate that classification of the product description information in the class corresponding to the previous result should be manually validated.

24. The software of claim 19, operable to, if the suffix count for the first new result is less than the suffix count for the previous result, then automatically select a next new result and compare the next new result with the one or more previous results until:

the suffix count for a selected next new result is greater than or equal to the suffix count for a previous result; or there are no more new results from which to select.

25. The software of claim 19, operable to, if the suffix count for the first new result is equal to the suffix count for the previous result, then automatically determine whether the class for the first new result is the same as the class for the previous result and:

if not, mark the previous result as ambiguous to indicate that classification of the product description information in the class corresponding to the previous result should be manually validated; and if so, add the one or more keywords associated with the class to a sublist of keywords maintained for the previous result.

26. The software of claim 19, operable to, if a single previous result is not marked as unambiguous after all words in the product description information have been selected and processed, then:

for each previous result with a highest suffix count, automatically determine whether a predetermined exclude word for the class corresponding to the previous result is found among all the words of the product description information and, if so, eliminate the previous result; and if a single previous result with a highest suffix count remains, automatically mark this previous result as unambiguous and classifying the product description information in the class corresponding to this previous result.

27. The software of claim 26, operable to, if more than one previous result with a highest suffix count remains, then automatically mark this previous result as ambiguous to indicate that classification of the product description information in the class corresponding to this previous result should be manually validated.

28. A computer-implemented system for automatically classifying product description information comprising:

means for automatically determining whether a predetermined strip word is found in the product description information, before the first word is selected, and if so, eliminating the strip word and each word found subsequent to the strip word and before a next delineator in the product description information;

means for automatically selecting a first word from the product description information;

means for automatically determining whether the first word is defined as a prefix word within one or more keywords, each keyword being associated with one of a plurality of classes, each class being associated with one or more keywords;

means for, if the first word is defined as a prefix word within one or more keywords, then for each keyword for which the first word is defined as a prefix word, automatically determining whether all suffix words of the prefix word within the keyword are found among all remaining words in the product description information in sequence;

means for, for each keyword for which all suffix words of the prefix word within the keyword are found among all remaining words in the product description information in sequence, automatically generating a new result for each class associated with the keyword;

means for performing the following:

automatically selecting a first new result;

automatically comparing the first new result with one or more previous results each corresponding to a class;

if a suffix count for the first new result is greater than a suffix count for a previous result, then automatically marking the new result as unambiguous, the new result being thereafter considered a previous result; and if one or more new results remain unselected, then automatically selecting a next new result and repeating the above-described steps of comparing, marking, and selecting a next new result until no new results generated for the first word remain unselected;

means for, if one or more words in the product description information remain unselected after processing the first word, then automatically selecting a next word and repeating the above-described steps of determining, generating, performing, and selecting a next word until no words remain unselected; and means for, if a single previous result is marked as unambiguous after all words in the product description information have been selected and processed, then automatically classifying the product description information in the class corresponding to the previous result marked as unambiguous.

* * * * *